United States Patent [19]

Kato et al.

[11] Patent Number: 4,795,859
[45] Date of Patent: Jan. 3, 1989

[54] CONTROL DEVICE FOR ELECTRIC TRAIN

[75] Inventors: Akira Kato, Hachioji; Junichiro Yamada, Mitaka, both of Japan

[73] Assignee: Kabushiki Kaisha Toshiba, Kawasaki, Japan

[21] Appl. No.: 143,676

[22] Filed: Jan. 14, 1988

[30] Foreign Application Priority Data

Jan. 14, 1987 [JP] Japan .................................. 62-4917

[51] Int. Cl.⁴ .............................................. B60L 1/00
[52] U.S. Cl. .......................................... 191/4; 191/5; 191/7; 191/11; 307/9
[58] Field of Search ..................... 191/3, 4, 5, 6, 7, 11; 105/27; 307/9, 64, 66, 149, 150

[56] References Cited

U.S. PATENT DOCUMENTS

| 799,516 | 9/1905 | Bliss | 307/9 |
| 822,275 | 6/1906 | Hill | 307/9 |
| 921,176 | 5/1909 | Stearns | 191/3 |
| 3,424,995 | 1/1969 | Parente | 307/64 |
| 4,145,618 | 3/1979 | Restori et al. | 307/64 |

FOREIGN PATENT DOCUMENTS

| 653970 | 12/1937 | Fed. Rep. of Germany | 191/3 |
| 728230 | 11/1942 | Fed. Rep. of Germany | 191/3 |
| 2252229 | 7/1975 | France | 191/5 |

Primary Examiner—Robert B. Reeves
Assistant Examiner—Frank Williams
Attorney, Agent, or Firm—Oblon, Fisher, Spivak, McClelland, & Maier

[57] ABSTRACT

A control device for an electric train formed of plural coupled carriages each of which receive power from an overhead power line via a collector, wherein each carriage is provided with a power converter for converting power from the overhead line to a suitable level for a load within the respective carriage. Each carriage also includes an auxiliary power supply device having an input coupled to the output of the power converter of the another carriage and an output coupled to an input of the power converter of the same carriage, so that if the power level from the overhead line to one carriage falls below a predetermined value, the power converter of that carriage is supplied with power from the power converter of another carriage through the intermediary of the auxiliary power supply device of the same carriage.

2 Claims, 3 Drawing Sheets

CONTROL DEVICE FOR ELECTRIC TRAIN

BACKGROUND OF THE INVENTION

1. Field of the Invention

This invention relates to a control device for an electric train which is driven with several carriages coupled together.

2. Discussion of Background

In most railway carriages, power for the various kinds of control devices, air-conditioning, lighting equipment, etc. mounted in the carriages is obtained from a power converter connected to a current collector (referred to below as a pantograph). This power converter convert the high voltage of the overhead line to a voltage suitable for the various devices and thus supplies these devices with power. An inverter may be used, for example. When there is a momentary interruption of the input power from the overhead line, owing to loss of contact with the overhead line due to vibration of the pantograph or the passage of the carriage thoough a dead section, a protective device stops this inverter from operating. The inverter is restarted later, when prescribed conditions have been fulfilled. When the inverter stops and restarts, devices such as (for example) air-conditioning devices constituting the load cease operating temporarily and are later restarted successively. The fact that the air-conditioning and lighting equipment cease operating every time power input is interrupted because of loss of contact between the pantograph and the overhead wire or passage through a dead section results in a deterioration of the service to passengers.

The conventional approach for dealing with this momentary interruption of power, when several carriages are coupled together, is to connect all the pantographs in parallel by means of a through-lead. With such a through-lead connection, even if one pantograph loses contact with the overhead wire or passes through a dead section, power is obtained from the other pantographs, which are still in contact with the overhead line. Another approach is to enlarge the capacity of the filter condenser provided on the DC input side of the inverter, so that during a momentary power failure the inverter is driven by discharge from this filter condenser.

However, the through-lead which is provided between carriages to connect the pantographs in parallel connects them in parallel directly, and is therefore a high-voltage line. This gives rise to a safety problem, and various protective devices have to be provided to ensure that safety is maintained.

On the other hand, the fact that the filter condenser is mounted on the carriage imposes restrictions on its weight and size, and the extent to which its electrostatic capacity can be increased is limited.

Consider, for example, the relation between the filter condenser voltage and the period of loss of contact between the pantograph and the overhead line, as shown in FIG. 4. If the voltage of the filter condenser when charged up to the voltage of the overhead line is taken as V1, and the filter condenser voltage at T seconds after loss of contact between the pantograph and the overhead line as V2, we have the following approximate equation.

$$\tfrac{1}{2} C (V1^2 - V2^2) = 130 \times 10^3 \times T \qquad (1)$$

Now if V1=1500V (overhead line voltage), V2=900V (value set for low voltage protection), and C=1500 μF, then T is approximately equal to 8 ms. This means that at approximately 8 ms after the pantograph has lost contact with the overhead line, the voltage of the filter condenser, which was charged up to 1500 V, drops to 900 V. When the voltage of the filter condenser falls as far as this figure of 900V, the value set for low voltage protection, a protective device stops the operation of the inverter. In practice, since th period during which the pantograph is out of contact with the overhead line often exceeds 10 ms, it is difficult to achieve a continued supply of power by means of discharge from the filter condenser when the main supply is interrupted.

SUMMARY OF THE INVENTION

Accordingly, one object of this invention is to provide a novel control device for an electric train which can provide sufficient power for the load when the power supply is interrupted owing to the pantograph losing contact with the overhead line or because of passage through a dead section.

Another object of this invention is to provide a control device for an electric train in which the level of safety of the through-lead connecting the inverters and auxiliary power supply devices during maintenance etc. is higher than if the pantographs are directly connected together in parallel, and which does not necessitate the provision of any special safety device.

These and other objects are achieved according to the invention by providing an electric train control device having power converters which supply power to the loads in the carriages, and also having auxiliary power supply devices, wherein a power converter is provided in each of a plurality of coupled carriages and in each case converts the power obtained via a collector from the overhead line to power suited to the load in the respective carriage. Each carriage also is provided with an auxiliary power supply device having an input connected to the output of a power converter of another carriage. When the voltage input from the overhead line into the power converter of a one carriage falls below a prescribed value, the auxiliary power supply device of that carriage converts power obtained from the power converter of another carriage and supplies this power as input to the power converter of its own carriage.

Advantageously each auxiliary power supply device supplies current to its converter only for a set time from the moment when the voltage input from the overhead line into the power converter falls below a prescribed value, which set time is longer than the normal period of disconnection and the time required to pass a dead section.

Thus, according to the invention, in each of several coupled electric carriages there is provided a power converter which converts the power obtained via the current-collector from the overhead line and supplies it to the load inside the carriage. In addition, an auxiliary power supply device is provided in each carriage. This auxiliary power supply device converts power from the converter in any other carriage and delivers this power as input to the converter in its own carriage, the output of which then supplies power to the load in that carriage.

The power converter of each each carriage converts power obtained from the overhead line via the current-collector and supplies it to the load inside the respective carriage, and also supplies it to the auxiliary power supply devices provided in the other carriages. When the input voltage of a converter in a carriage having an auxiliary power supply device falls below a prescribed value, this auxiliary power supply device supplies to the loads, via the converter, power obtained from the power converters of other carriages. This enables the converters to supply power to the loads even when the current-collector has lost contact with the overhead line or during passage through a dead section.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
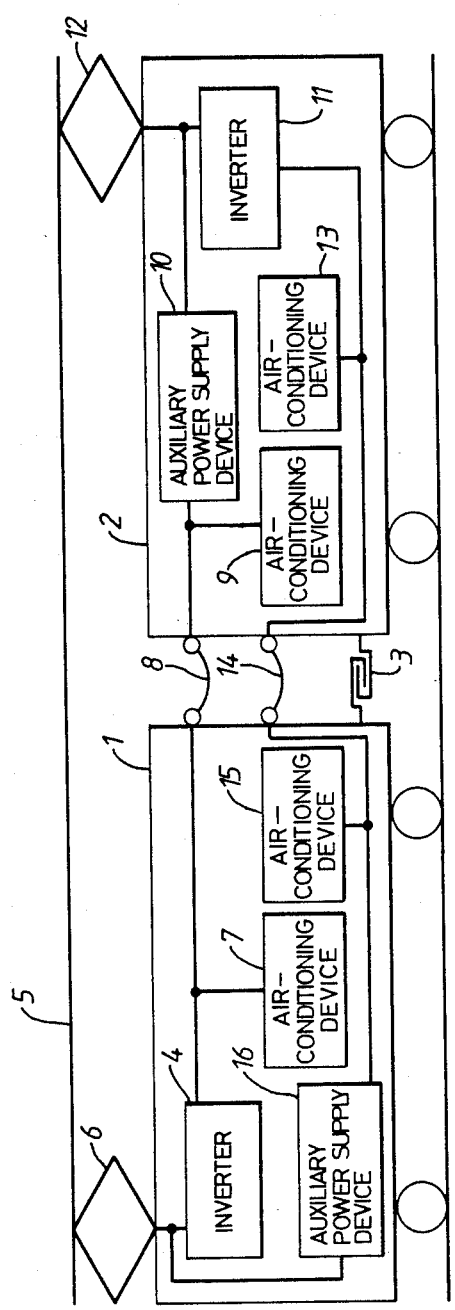
FIGS. 1 and 2 are block diagrams of an embodiment of an electric train control device based on the invention.

Referring now to the drawings, wherein like reference numerals designate identical or corresponding parts throughout the several views, FIG. 1 is a block diagram of a control device for an electric train according to the invention. Carriages 1 and 2 are coupled by a coupler 3. Although this embodiment is described in terms of two carriages coupled together, the same explanation applies when the coupled carriages number three or more. DC power is input into an inverter 4, mounted in carriage 1, from an overhead line 5 via a pantograph 6. Inverter 4 converts the DC to three-phase AC power and supplies this both to an air-conditioning device 7 in carriage 1 and, via a through-lead 8, to an air-conditioning device 9 in carriage 2. Inverter 4 also supplies AC power via through-lead 8 to an auxiliary power supply device 10 in carriage 2. This auxiliary power supply device 10 rectifies this AC power and supplies DC power to the input side of inverter 11 in carriage 2.

Inverter 11 of carriage 2 receives input DC power from overhead line 5 via a pantograph 12. Inverter 11 supplies three-phase AC power both to an air-conditioning device 13 in carriage 2 and, via a through-lead 14, to an air-conditioning device 15 in carriage 1. Inverter 11 also supplies AC power via through-lead 14 to an auxiliary power supply device 16. This auxiliary power supply device 16 supplies DC power to the input side of inverter 4.

In this embodiment, air-conditioning devices form the load of inverters 4 and 11, but the same explanation applies also whether the load consists of air-conditioners or lighting equipment or other loads. Further, to provide redundancy when an inverter cuts out, the construction is such that half of the air-conditioning devices provided in each carriage is supplied with current from the other carriage.

With the construction described above, when pantographs 6 and 12 are obtaining power normally from overhead line 5, inverter 4 converts DC power input from pantograph 6 to AC power and supplies this power to air-conditioning devices 7 and 9, which are driven by this AC power output. The same applies to inverter 11 and air-conditioning deiices 15 and 13.

An explanation is next given of what happens when a pantograph loses contact with the overhead line or the carriage passes through a dead section. When for example pantograph 6 loses contact and the supply of power from overhead line 5 to inverter 4 is interrupted, auxiliary power supply device 16 supplies the required DC power to inverter 4. Therefore, since inverter 4 now obtains power via pantograph 12, inverter 11 and auxiliary power supply device 16, it can continue to supply power to air-conditioning devices 7 and 9 even when pantograph 6 has lost contact with the overhead line. The same applies when pantograph 6 passes through a dead section. Similarly, when pantograph 12 loses contact or passes a dead section, DC power is supplied to inverter 11 from auxiliary power supply device 10.

Figure 2:
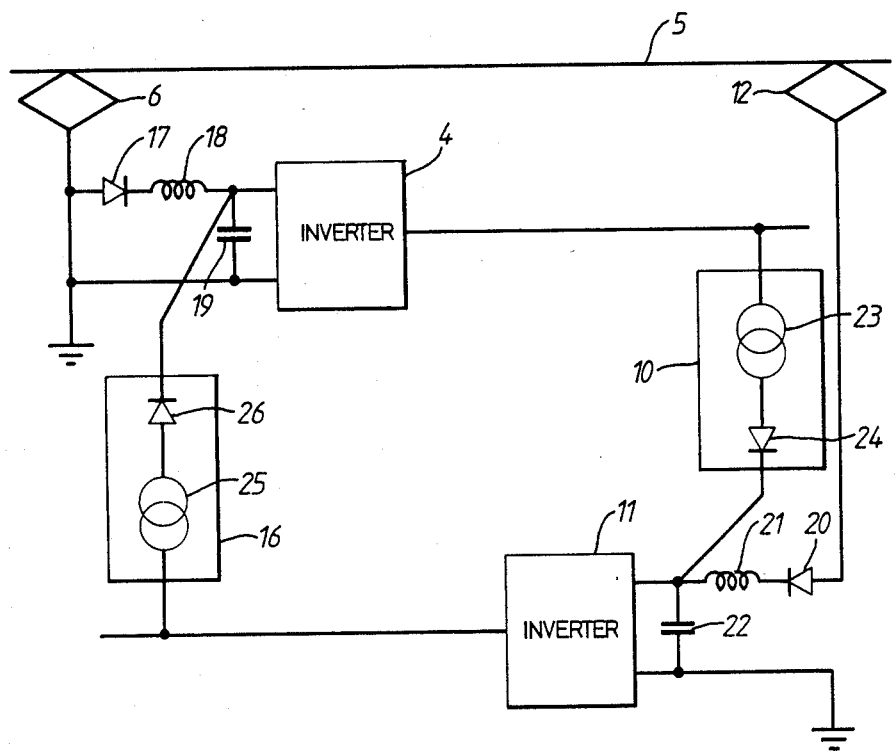

An explanation will now be given of the construction of auxiliary power supply devices 10 and 16 and of inverters 4 and 11, referring to FIG. 2. Inverter 4 is connected to pantograph 6 via a diode 17 and a filter reactor 18. A filter capacitor 19 is connected in parallel to the DC input terminal of inverter 4. Inverter 11 is connected to pantograph 12 via a diode 20 and a filter reactor 21. A filter capacitor 22 is connected in parallel to the DC input terminal of inverter 11.

The AC output terminal of inverter 4 is connected to the input terminal of auxiliary power supply device 10. The DC output terminal of auxiliary power supply device 10 is connected to the input terminal of inverter 11. The AC output terminal of inverter 4 is also connected to air-conditioning devices 7 and 9 (not shown in the drawing). Auxiliary power supply device 10 has a transformer 23 and a rectifier 24. AC power input from inverter 4 is stepped up in voltage by transformer 23 and is rectified by rectifier 24, and the resulting DC power is output to the input side of inverter 11. The same applies to auxiliary power supply device 16, which has a transformer 25 and a rectifier 26.

If for example the voltage of the overhead line is 1500V, and the output of inverters 4 and 11 is three-phase AC power of 440V (line-to-line-voltage), auxiliary power supply devices 10 and 16 receive this three-phase current of 440V as input, and output 1000V DC.

Figure 3:
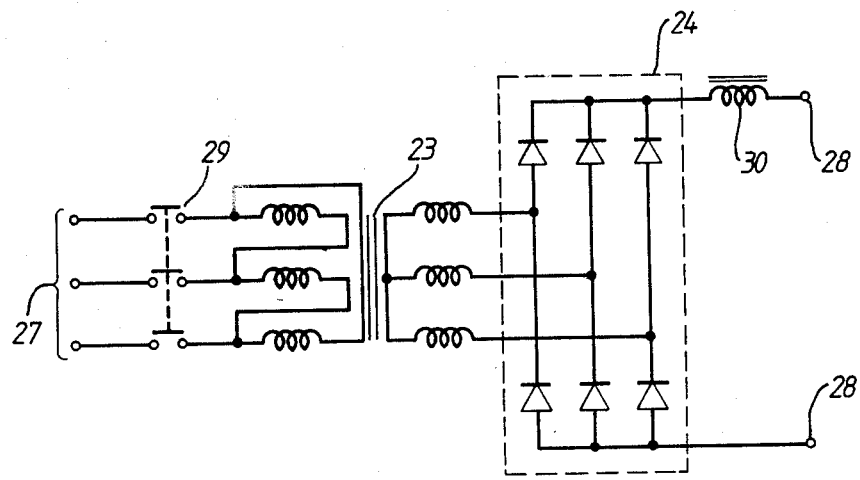
FIG. 3 is a block diagram of the auxiliary power supply device shown in FIG. 2.
Figure 4:
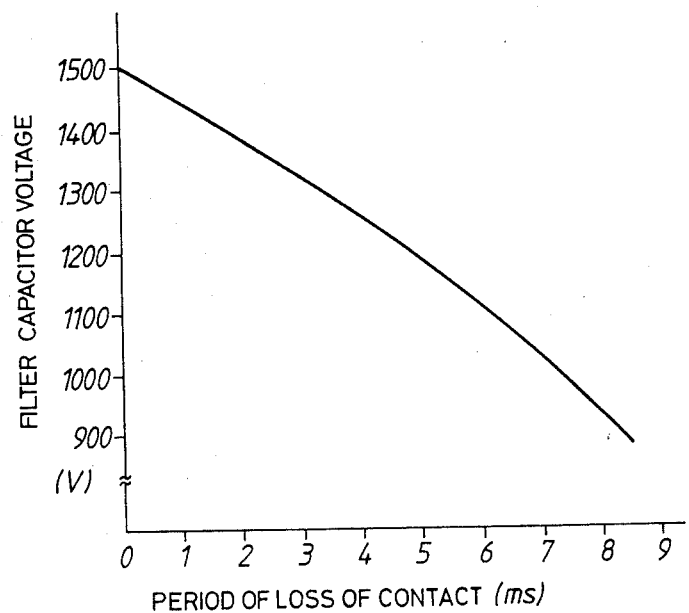
FIG. 4 is a graph of the relation between filter capacitor voltage and the length of time for which the pantograph is out of contact with the overhead line.

A detailed explanation will be given next, with references to the drawings, of auxiliary power supply devices 10 and 16. FIG. 3 is a block diagram of auxiliary power supply device 10. The auxiliary power supply device 16 is constructed in the same way. Three-phase AC input terminals 27 are connected to the three-phase output terminals of inverter 44 (not shown in the drawing). DC output terminals 28 are connected to the DC input terminals of inverter 11 (not shown in the drawing). The input terminals of transformer 23 are connected via contactors 29 with three-phase AC input terminals 27. Rectifier 24 is connected to the output terminals of transformer 23. The output terminals of rectifier 24 are connected via a smoothing reactor 30 to DC output terminals 28. Contactors 29 are controlled by a control device (not shown in the drawing). This control device closes contactors 29 simultaneously with the start-up of inverter 4. While inverter 4 is operating, the control device starts counting from the moment when the voltage of filter capacitor 19 drops below 1000V, and opens contactors 29 one second thereafter.

However, if the voltage of filter capacitor 19 drops below 1000V but recovers to more than 1000V within one minute, this control device of contactors 29 keeps contactors 29 open. The use here of a voltage of 1000V across filter capacitor 19 as a condition for the operation of contactor 29 is merely an example, the only requirement being that the voltage in question should be below the voltage value of the DC output of auxiliary power supply device 16.

An explanation will now be given of the working of the electric train control device of the construction described above, referring to FIGS. 2 and 3. The case when pantographs 6 and 12 have not lost contact with overhead line 5 and are not passing a dead section, and DC power of 1500V is therefore being supplied normally from overhead line 5 to inverter 4, is first explained. Inverter 4 inputs DC power of 1500V from overhead line 5, and, in addition to supplying three-phase AC power of 440 V to air-conditioning devices 7 and 9, also supplies three-phase AC power of 440V to auxiliary power supply device 10. Auxiliary power supply device 10 steps up and rectifies this input of three-phase AC power by means of transformer 23 and rectifier 24, and outputs DC power of 1000V to inverter 4. Inverter 11 inputs DC power of 1500V from overhead line 5 via pantograph 12 and outputs three-phase power of 440 V. Auxiliary power supply device 16 inputs the three-phase AC power output by inverter 11, and outputs DC power of 1000V to inverter 4.

An explanation follows next of the case when, for example, pantograph 12 loses contac with overhead line 5. When pantograph 12 loses contact, inverter 11 operates with filter capacitor 22 as its power source. When, as filter capacitor 22 discharges, its voltage falls to 1000V or below, inverter 11 receives as an input the 1000V DC output by auxiliary power supply device 10, and thus continues to operate. If pantograph 12 makes contact again with overhead line 5 within one minute, inverter 11 operates by inputting 1500V fro overhead line 5. If however the voltage of filter capacitor 22 falls below 1000V for more than one second as a result of pantograph 12 losing contact with overhead line 5, contactor 29 opens, stopping the supply of power by auxiliary power supply device 10. Auxiliary power supply device 10 does not supply power for longer than one second after pantograph 12 has lost contact with overhead line 5, but since disconnection of the pantograph does not normally continue for longer than one second, this does not constitute any problem. The reason why auxiliary power supply device 10 is designed to supply power for only one second is so that this device does not have to be made larger than is necessary. The above explanation dealt with the case when pantograph 12 loses contact with overhead line 5, but the same applies when there is an interruption of power supply due to pantograph 12 passing a dead section. Inverter 4 and auxiliary power supply device 16 also operate in the same way when pantograph 6 loses contact with overhead line 5 or passes a dead section.

Since as above explained the inverters can obtain DC power from the auxiliary power supply devices even when their pantograph becomes disconnected or passes a dead section, power can continue to be supplied to the air-conditioning devices when this occurs. These air-conditioning devices can continue to operate, therefore, even when power cannot be obtained from the overhead line, as when a pantograph loses contact or passes a dead section. This has the effect that the service to passengers is improved. Further, since each auxiliary power supply device is controlled such that it does not supply power to the inverter continuously for more than one second, these devices can be made smaller and lighter.

In the above embodiment, each auxiliary power supply device is constructed of a transformer and a rectifier, and the explanation refers to a low-voltage AC through-lead. However, if a DC through-lead is used, a booster chopper may be used for the auxiliary power supply device, power then being supplied to the inverter from this booster chopper when the pantograph loses contact.

Again, the explanation of the embodiment described above referred to a DC overhead line. If the line is AC, the following applies.

With an AC carriage, power from the overhead line is stepped down by a main transformer, then rectified and supplied to the inverter. In this case too, when a pantograph loses contact, power is supplied to the inverter from an AC low-voltage through-lead or a DC low-voltage through-lead, after stepping up by the method described above.

Further, the explanation of the embodiment refers to an inverter as the power converter for the carriages of the electric train, but the same action and effects can be obtained by using a DC/DC converter in place of the inverter.

The provision in each carriage of an auxiliary power supply device which obtains power from a power converter in another carriage enables the power converter of one carriage to obtain power from the auxiliary power supply device of another carriage when its input voltage falls below a given value, and so to supply power to the load. This makes it possible for power to be supplied to the load even when a pantograph has lost contact or is passing a dead section.

Obviously, numerous modifications and variations of the present invention are possible in light of the above teachings. It is therefore to be understood that within the scope of the appended claims, the invention may be practiced otherwise than as specifically described herein.

What is claimed as now and desired to be secured by Letters Patent of the United States is:

1. A control device for an electric train having plural coupled carriages each of which receives power for driving respective loads within each carriage via a collector from an overhead power line, comprising:
   each carriage having a power converter coupled to said power line via a respective collector for converting power from said power line to a level suitable for at least one load within the respective carriage; and
   each carriage having an auxiliary power supply device having an input coupled to a power output of a power converter of another carriage and an output coupled to an input of the power converter of the same carriage so that when the power supplied via said overhead power line to one of said carriages falls below a predetermined value, the power converter of said one of said carriages receives via the auxiliary power supply device of the same carriage power from the power converter of said another carriage.

2. A control device according to claim 1, further comprising:
   means for interrupting supply of power from the auxiliary power supply device of said another carriage to the power converter of said one carriage after a set time from when the power to said one carriage from the overhead power line falls below said predetermined value.

* * * * *